Aug. 26, 1969    J. H. DOLL ET AL    3,463,671
SEA WATER ACTIVATED PRIMARY BATTERIES AND
METHOD OF OPERATING SAME
Filed Feb. 10, 1967    3 Sheets-Sheet 1

INVENTORS
JEAN, HENRI, DOLL
HENRI, DESIRE DRUESNE
BY
ATTORNEYS

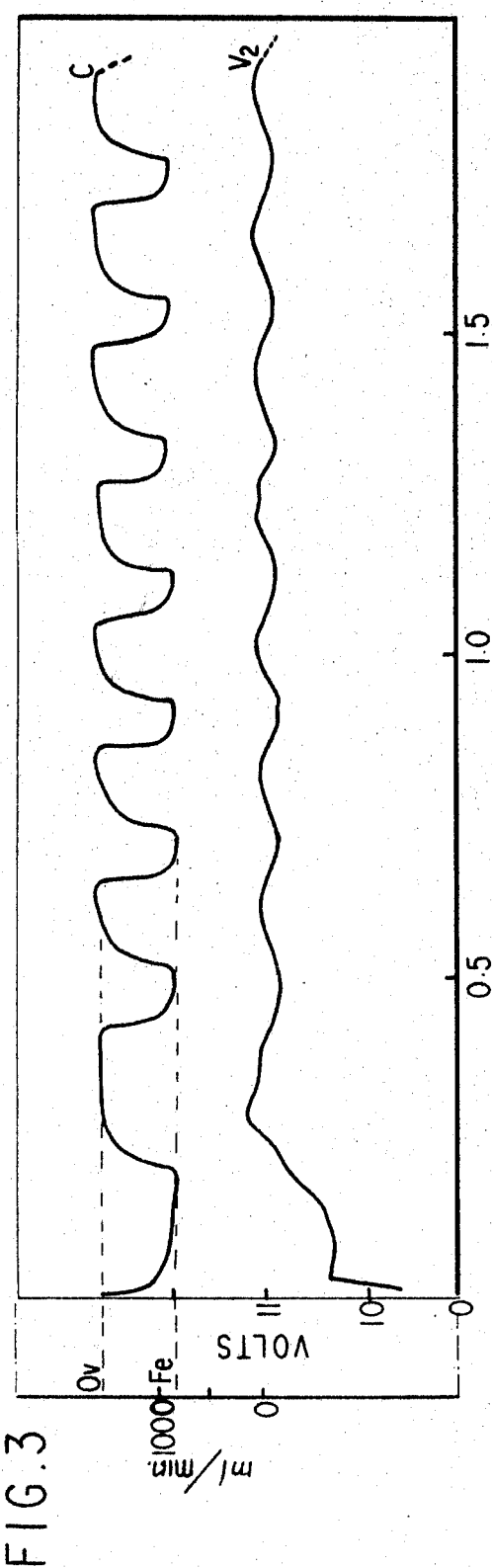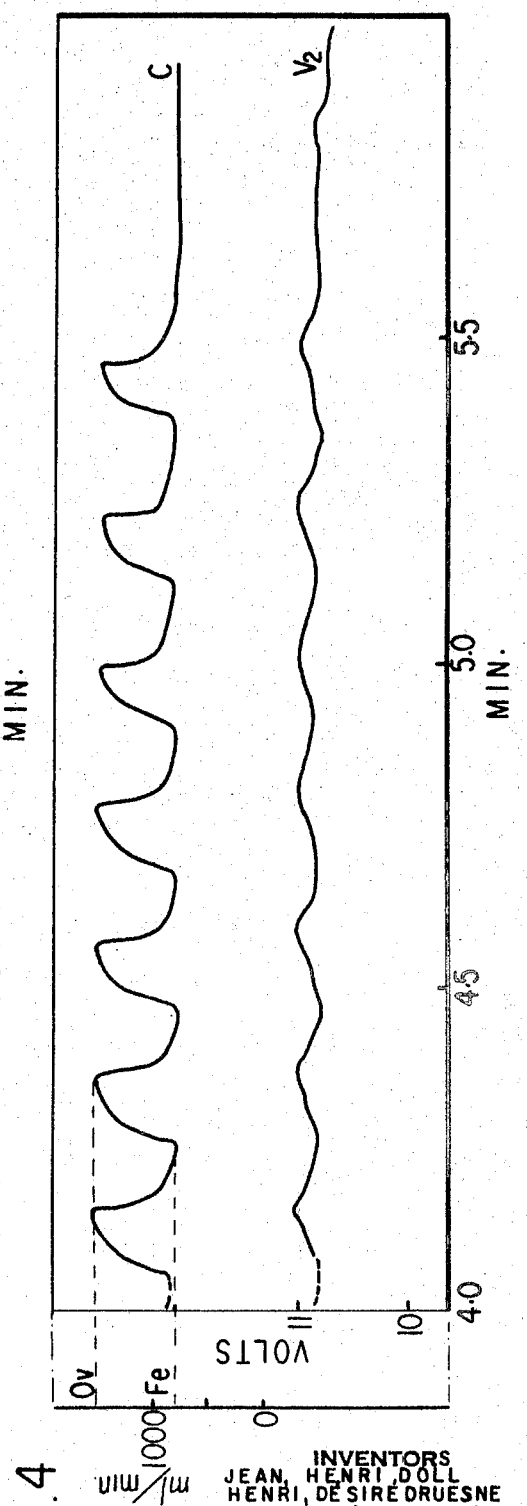

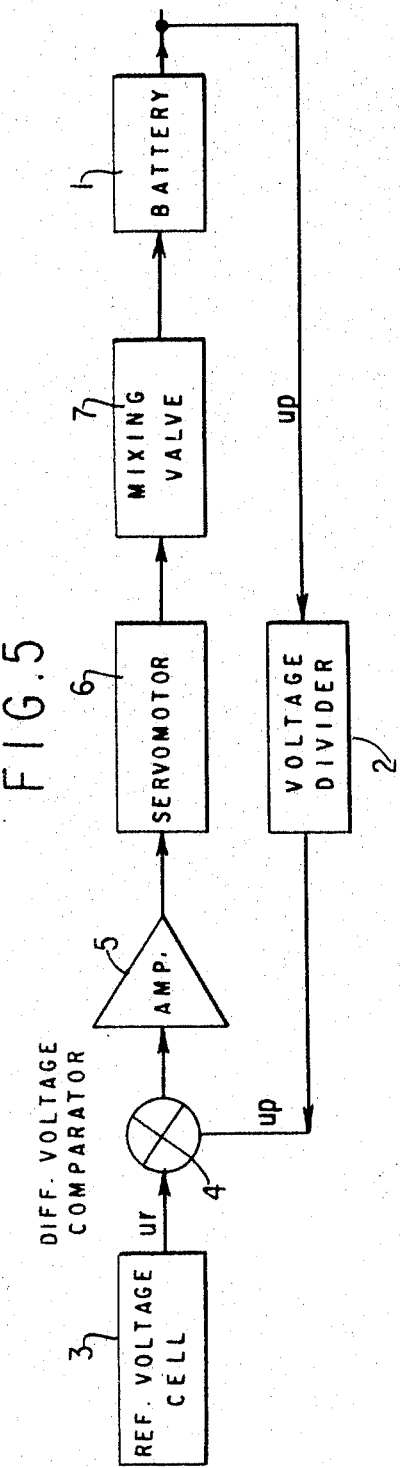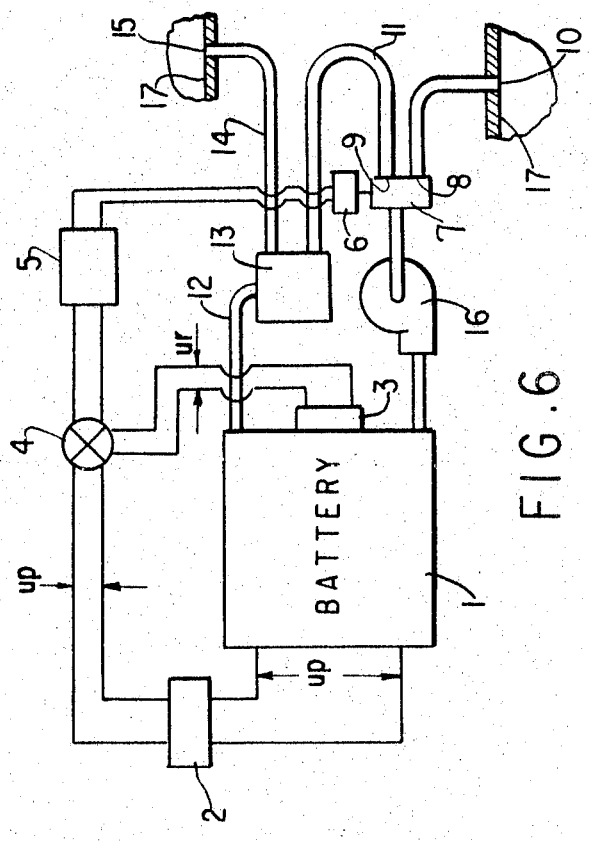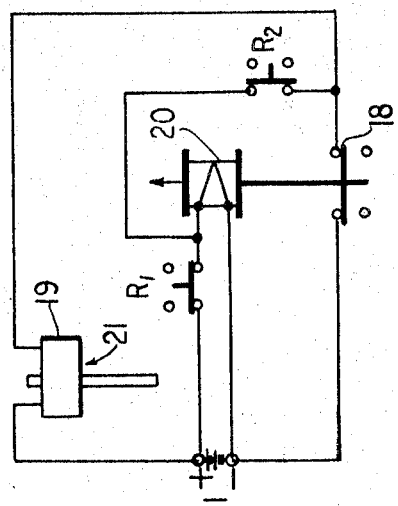

United States Patent Office 3,463,671
Patented Aug. 26, 1969

3,463,671
SEA WATER ACTIVATED PRIMARY BATTERIES AND METHOD OF OPERATING SAME
Jean Henri Doll, Aulnay-sous-Bois, and Henri Desire Druesne, La Courneuve, France, assignors to Societe des Accumulateurs Fixes et de Traction (Societe Anonyme), Romainville, France, a company of France
Filed Feb. 10, 1967, Ser. No. 615,220
Claims priority, application France, Feb. 17, 1966, 50,069, Patent 1,476,706
Int. Cl. H01m 17/02, 31/04
U.S. Cl. 136—160                                       17 Claims

ABSTRACT OF THE DISCLOSURE

Primary batteries of the magnesium-silver chloride type activated by electrolyte having substantially the salinity of sea water, utilizing controlled mixtures of fresh and used electrolytes monitored by the voltage at the terminals of the battery, including electrically controlled valve means at the inlet port for fresh electrolyte and a mixing valve for regulating the ratio of fresh electrolyte and used electrolyte pumped through the battery for the purposes of maintaining uniformity of operative characteristics of the battery after activation as well as method for operating said batteries including use of an amplifier whose output effects operation of the valve means and whose input is the difference between a reference voltage supplied by a standard voltage reference source and the voltage at the battery terminals and engines such as torpedoes or the like operated by such baterries.

RELATED APPLICATIONS

There are no related applications of applicants currently pending in the Patent Office.

BRIEF SUMMARY OF INVENTION

This invention relates to primary batteries, and more specifically to the so-called "primary batteries activated with sea water," preferably operating with sea water, or any solution whose salinity is about the same, such as magnesium-silver chloride batteries. A further object of the invention is to provide a control of the electrical operative characteristics of these batteries.

Batteries activated with sea water are known to have very useful characteristics among which stress might be put on high power-to-weight and power-to-volume ratio, or great ability for long storage owing to the fact that the battery cannot be operated before filling with a salt solution. Nevertheless, a close examination of the working conditions of such a battery shows that the instantaneous elctrical characteristics depend on several factors among which are:

Average temperature of the electrolyte in the battery, which depends particularly on the temperature of the water (sea water for instance) introduced into the battery;

Degree of salinity of the aqueous electrolyte, which depends particularly on the degree of salinity and volume of the water admitted into the battery, the temperature and the degree of salinity affecting the conductiviy of the electrolyte;

Electrodes consumption, which during the operation of the battery, increases the space between the electrodes, and thus increases the internal resistance of the battery.

This close examination of a working battery shows also that the electrochemical and chemical reactions occurring there are strongly exothermic and deliver large amounts of slurry and hydrogen.

Should the electrolyte (i.e. sea water) flow freely inside a working battery, it would be easy to cool it effectively, to remove the used elechtrolyte simultaneously with the impurities and slurry resulting from electrochemical and chemical reactions, but it would also leave electrical characteristics out of control.

It has been observed that the voltage continuously decreases from the completion of activation in a battery activated with sea water if the flow of electrolyte is not monitored according to the voltage at the terminals of the battery. A regulation of the flow by the voltage will tend to maintain the voltage of the battery during the discharge a a predetermined value which is characteristic of the system irrespective of the salinity and temperature of the fresh electrolyte.

Due to the fact that the conductivity of the electrolyte increases when the temperature and the degree of salinity increases, it is advantageous to limit the flow of fresh electrolyte, i.e., the amount of sea water introduced into the battery, in such a way that temperature and salinity can rise in the battery, the voltage of which will rise at the same time. However, neither the temperature of the electrolyte must reach too high values, nor must the wastes of electrochemical and chemical reactions accumulate in the space between electrodes. In fact, besides the production of magnesium chloride which is a favorable phenomenon, the evolution of a large quantity of gaseous hydrogen, of significant amounts of magnesium hydroxide takes place and both products have pernicious effects on the electrical performances of the battery.

In the previous art solutions have been suggested for operating primary batteries with sea water. Among these, consideration must be given to the U.S. Patent 3,012,087 dealing with the post-activation process, and which is based as follows:

Controlling the amount of fresh electrolyte introduced in the battery by means of a valve located at the outlet for used electrolyte returned to the sea; the opening of which valve depends on the voltage of the battery.

Maintaining a partial recirculation of used electrolyte.

With such a device a good control of the voltage can be achieved over a comparatively wide range of temperature and salinity.

However, when the conditions of temperature and salinity are less favorable, troubles may appear, among which are:

At the end of the discharge the flow of fresh electrolyte becomes very slow and the temperature increases excessively in some cases;

For this reason, the battery may choke by accumulation of slurry;

The rate of electrolyte flow through the battery depends on the speed and the distance covered by the engine or torpedo in which the battery is fitted; operation might consequently be defective;

The salinity and the temperature inside the battery may not be homogeneous, particularly at the end of operation, when the rate of electrolyte flow is reduced and slurry is recirculated with electrolyte.

The present invention overcomes these difficulties after activation of the battery by supplying through the battery a substantially steady flow of electrolyte which is composed of a variable flow of fresh electrolyte and a complementary variable flow of recycled electrolyte, free from gases, slurry and wastes.

It will be appreciated that, in this way, a steady flow of electrolyte with optimal characteristics circulates through the battery, securing particularly a good homogeneity in temperature, in salinity and in wear of plates at every spot in the battery.

According to another feature of the present invention, the ratio of the flow of fresh electrolyte to the flow of recycled electrolyte is continuously monitored by the voltage of the battery. When the terminal voltage of the battery rises higher than a reference voltage, the flow of recirculated electrolyte decreases, and, reversely, when the terminal voltage falls below the said reference voltage, the flow of recirculated electrolyte is increased. As the reference voltage consists of a separate device, such as a standard cell, or any device at steady voltage, it will be seen that an optimum control of the battery may be obtained.

Another object of the present invention is to provide the control of the electrolyte amount admitted into the battery by means of a device located at the inlet for the said electrolyte, the outlet port being permanently kept open, after activation at least.

The invention also relates to batteries activated with sea water where the batteries are lodged in containers or the like having first at least one inlet port fitted with means for regulating the flow of fresh electrolyte introduced in the battery, according to the instantaneous electrical characteristics during operation and secondly, at least one outlet port for the used electrolyte, the said outlet port being always kept open at least after activation.

This invention relates also, according to a particular embodiment, to the said means for obturating the inlet port, which consist of an electrovalve or the like having two positions at least. In such conditions, obviously, the required power supplied by the battery for self-regulation can be very low.

Another feature of the invention is that the said means for obturating the inlet port are powered by relays or the like respectively energized when the voltage of the battery reaches values either above or below the nominal voltage but close to this voltage.

Another feature of the invention is to provide a device, time relay or the like acting, for instance, on the said means for obturating the inlet port, in order to secure a quick access of the sea water required for a complete filling of the battery during the very short time of activation. If desired, a secondary inlet can be provided, only kept open for activation.

Another feature of the invention, according to a preferred embodiment, is that the said means for control consist of a mixing-valve connected to a pump controlling the flow of electrolyte, the said valve being provided with two inlets respectively connected to the said inlet port for the fresh electrolyte and to another inlet port for the used electrolyte, already charged in salt and heated by passage through the battery, and drawn out of a space where it has been freed from gases and slurries. The said mixing-valve is also provided with an outlet connected to the pump, by which the electrolyte is sent into the battery.

Another feature of the invention is that the mixing valve controlled by the voltage of the battery comprises a device such as a servo-motor supplied with the output signal of an amplifier the input signal of which is composed of the difference in voltage between a reference voltage, such as a standard cell or any steady voltage device supplied by the battery and the voltage or a fraction of the voltage delivered by the battery at every moment.

Any difference in voltage below the said reference voltage can act upon the regulation system: amplifier, servo-motor, mixing-valve, in order to cause an increase in the ratio of used electrolyte flow/fresh electrolyte flow. Reversely, any difference in voltage above the said reference voltage can act on the regulating system in order to cause a decrease in the ratio of used electrolyte flow/fresh electrolyte flow.

In addition to the advantage in improving the homogeneity of temperature, salinity and wear of the electrodes at every point inside the battery, already mentioned above, the use of a pump ensures effectively a substantially steady flow preventing the danger of slurries and wastes accumulation resulting from the chemical and electrochemical reactions originated in the battery. Moreover, the power required to move the pump and the servo-motor driving the mixing-valve is very low comparatively to the resulting gain in power.

A further advantage lies in the fact that the pump delivers an immediate homogeneous mixture in concentration and temperature, of both fresh and recycled electrolytes.

A still further advantage is that the constant output pump is of a very simple design and not costly. It may be, for instance, electrically driven by a motor supplied by the battery, or mechanically driven by the propeller shaft.

On the other hand, the flow of electrolyte through the battery is absolutely not dependent on the speed and the position of the engine carrying the battery.

In such a preferred embodiment, another advantage results from the fact that the inlet port and outlet port are provided in the side wall of the engine, consequently, these ports can easily be hermetically closed before activation, for instance, by pyrotechnical plugs and this arrangement will prevent any premature or accidental activation, for instance, in a torpedo fitted with a battery and placed in an immersed tube.

The invention relates also as new industrial products to all applications using the said batteries, and particularly engines, torpedos or the like driven by electrical motors supplied by this type of battery.

According to a further feature of the present invention, a rough control might be designed by means of a discontinuous admission of fresh electrolyte in the battery.

Other objects of the invention will become apparent and will be best understood from the following detailed description and the accompanying drawings presented for the purpose of explaining rather than restricting or limiting the invention.

In the drawings:

FIGURES 1 and 2 respectively show two diagrams representing the variation of the flows of fresh and used electrolytes, and the variation of the total flow passing through a battery activated with sea water, under two different conditions of salinity and temperature;

FIGURES 3 and 4 show two sets of curves corresponding respectively to the beginning and the end of operation of a battery regulated by a discontinuous admission of electrolyte indicating clearly the relationship between the flow of electrolyte and the voltage of the battery;

FIGURE 5 is a basic diagram showing the processing of the regulation system according to the invention;

FIGURE 6 is a diagram showing the processing of FIGURE 5 applied to a primary battery according to the invention; and FIGURE 7 is a diagram of a simplified regulation by means of a valve controlling intermittently admission of electrolyte into the battery.

DETAILED DESCRIPTION

Figure 1:
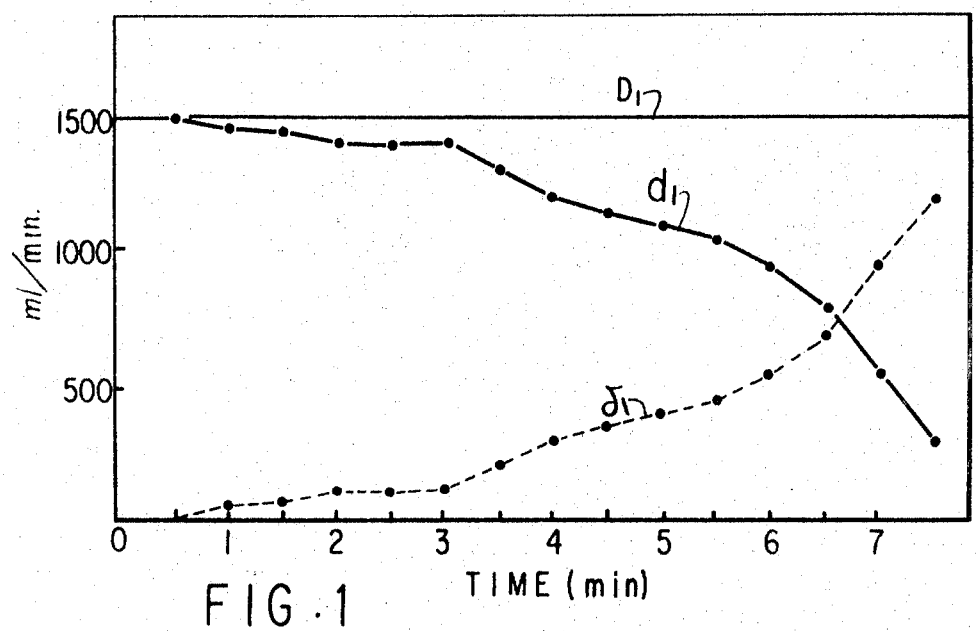

Referring now to the drawings, FIGURE 1 shows three curves respectively $d_1$, $\delta_1$ and $D_1$, representing the flow rates in ml. per minute vs. the time in minutes (zero being the start of the activation) for the fresh electrolyte introduced into the battery, for the used electrolyte and for the total amount passing through the pump established for a battery fitted according to the invention and operated with sea water having a salinity of about 3.5% and a temperature of about 15° C. The flow of fresh electrolyte decreases progressively while the flow of used electrolyte is increasing.

Figure 2:
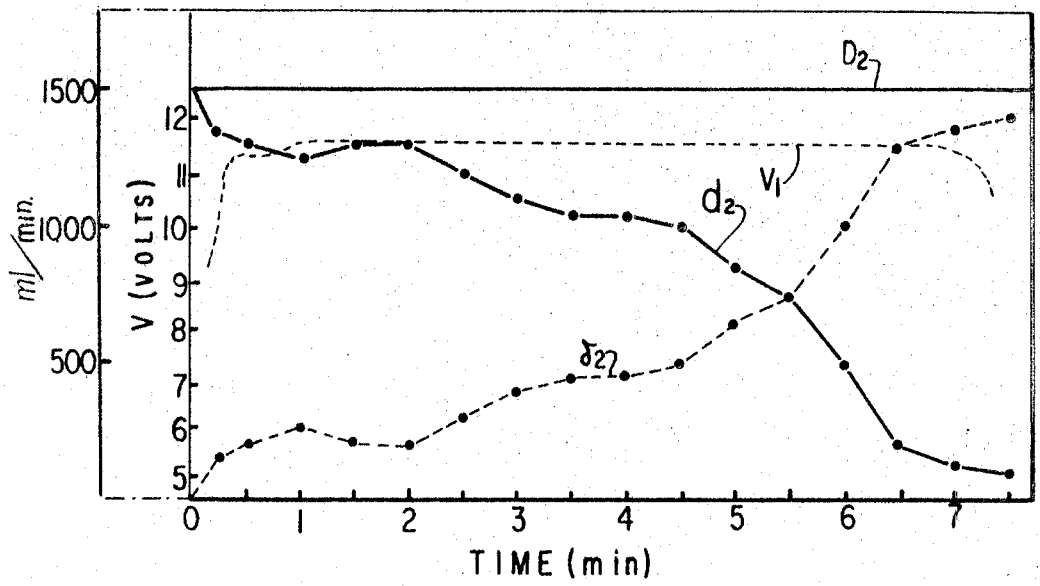

FIGURE 2 shows the curves $d_2$, $\delta_2$ and $D_2$ corresponding to $d_1$, $\delta_1$ and $D_1$ when the battery is activated with a different electrolyte at a salinity of 1% approximately and a temperature of 3° C. The flow of used electrolyte $\delta_2$ is much greater than the flow of used electrolyte $\delta_1$, for maintaining favorably the salinity and the temperature of the electrolyte in the battery.

As seen in FIGURES 2, 3 and 4, the voltage $V_1$ of the battery activated with such an electrolyte is higher than the voltage $V_2$ of the same battery operating under similar conditions but not fitted with a pump.

FIGURE 3 shows the curve C obtained during the first two minutes following the activation, with peaks ($Ov$) at the opening of the valve and hollows ($Fe$) at the closing of the valve controlling the admission of the fresh electrolyte into the battery. FIGURE 3 shows also the variation of the voltage $V_2$ causing the action of the valve. When the latter is closed, the electrolyte can still flow partially through the battery owing to a small aperture placed on the valve wall, for instance.

FIGURE 4 shows the same curves as in FIGURE 3, plotted during the 5th and 6th minutes of operation. It may be seen that the time of out-off exceeds the time of admission and that no regulation can take place when the voltage falls below the value prescribed before activation.

The use of a steady total flow of fresh electrolyte added to used electrolyte prevents any excessive rise in temperature, particularly when the operation is near to completion, and prevents also any choking due to the accumulation of slurry and wastes. Moreover, as stated, the battery output is higher, improved by the homogeneity of temperature, salinity and correlative wear of the electrodes.

FIGURE 5 shows a diagram of regulation where it can be seen that the voltage $U_p$ given by the battery 1 is reduced by a voltage-divider 2 to a value $u_p$, fraction of $U_p$ (compared to the potential, or connected ground, for instance, of the negative post of the battery). A reference voltage $u_r$ given by a standard cell 3 or any other steady voltage device is applied, simultaneously with the output $u_p$ of the voltage-divider 2, to a differential voltage comparator 4. The output signal of the comparator 4, i.e. the difference between $u_r$ and $u_p$, is applied to an amplifier either electromagnetic or electronic 5. The output signal of the amplifier 5 is then applied to the servo-motor 6 controlling the mixing-valve 7.

FIGURE 6 diagrammatically shows the regulation resulting from the action of the different parts described in relation to FIGURE 5. The mixing-valve 7 comprises two inlets 8 and 9 respectively connected to an inlet 10 for the fresh electrolyte and to a pipe 11 for the used electrolyte taken out of the battery 1, through a pipe 12 and a chamber 13 where gases are separated and slurry deposited. The slurries (principally magnesium hydroxide) are partially deposited in the chamber 13 while the gases (principally hydrogen) and the remaining slurries are returned to sea through the pipe 14 and the outlet port which is kept open. Through the pipe 14 the flow of used electrolyte is obviously nearly equal to the flow of fresh electrolyte entering the inlet 10. The flow of electrolyte is circulated by means of a pump 16 built to provide a nearly constant output. The pump 16, for instance, may be driven either mechanically by the propeller shaft or electrically by a motor supplied by the battery 1. The electrical energy required for the regulation is thus taken from the battery 1.

As the pump 16 ensures a steady flow of electrolyte, the inlet 10 may be placed in the side wall 17 of the engine, as a plain aperture. Similarly, an aperture 15 can be provided for the exhaust. Otherwise, if collector spoons were used, there would be a definite lowering of the engine speed.

In addition, the feeding of the battery does not depend either on the engine speed in the case of torpedoes having several speeds, or on the position of the engine along its course.

Another advantageous feature of the present invention, based on the very plain lines of the ports 10 and 15, is that these ports may be hermetically closed prior to activation, for instance, with pyrotechnical plugs. In consequence, safety is further increased, especially on submarines.

It is worthwhile to note that owing to the steady flow pump 16, the battery can be operated at a slight overpressure, which is very beneficial because the voltage of the battery increases with the relative increase in pressure. Thus, when not at deep immersion, a pressure increase of about 2 bars in the battery will correspond to an increase of about 5% in the voltage.

The valve 7 controlled by the servo-motor 6 might advantageously be a three-way valve type proportioning permanently the rates of used electrolyte/fresh electrolyte.

Owing to the invention, the operation of an engine driven by a battery activated with sea water, whose performnace will be practically independent of the temperature and salinity of the electrolyte, is safer and better.

However, considering some applications where temperature and salinity are well fixed and when the use of rotating parts such as a pump is not desired, it is possible to simplify the regulating device, for instance, by reducing the device to intermittent admissions of fresh electrolyte. This sort of regulation remains one of the typical features of the present invention as long as it is controlled by a valve located on the inlet for fresh electrolyte while the outlet is kept always open, at least as soon as the battery is activated, in order to guarantee a continuous clearing out of gases and slurry. Such a regulation may be achieved by the means of a circuit fed by the regulated battery 1, as seen in FIGURE 7, and which comprises two rated relays $R_1$, $R_2$ and a switch 18 energized by the winding 20 in series with the winding 19 of a magnet controlling the electro-valve 21.

The rate voltages of the contact have been chosen in the following example such that the various positions of the various contacts could be summarized according to the instantaneous values of the voltage V2 in the table below, where $Vn$ is the rated voltage:

| V2 | 0 | ↗0.50 V$\phi$ | ↗0.98 V$\phi$ | ↗1.02 V$\phi$ |
|---|---|---|---|---|
| $R_1$ | Off | On | Off | Off |
| $R_2$ | On | On | On | Off |
| 18 | Off | On | On if V2 ↗ / Off if V2 ↘ | Off |
| Valve | Open | Closed | Closed if V2 ↗ / Open if V2 ↘ | Open |

In this table, arrows going up correspond to increasing voltages and arrows going down correspond to decreasing voltages.

In addition, the power required to control such a circuit is very low, about 20 watts, compared to the power supplied by a battery of the activated type, which is generally about several tens of kilowatts.

It should be emphasized that, when activating a battery fitted with a regulating device, such as described above, the electro-valve is initially open since the relay $R_1$ is off, the voltage of the battery being null. Then, as water is filling very rapidly, the battery, the voltage increases, and the relay $R_1$ closes on as soon as the voltage exceeds a fixed value, for instance, 50% of the rated voltage. In these conditions, the valve will close and the voltage will still increase with the temperature and the salinity of the electrolyte until the voltage of the battery reaches a fixed value, for instance, 102% of the rated voltage, and this operates the opening of the electro-valve (see table hereinabove). At that moment, some fresh electrolyte will expel the used electrolyte and this will lower the temperature and salinity of the electrolyte in the battery. Thus, the voltage decreases down to 98% $V_n$. At this moment, the electro-valve will close by the effect of relay $R_2$ (see table hereabove); the voltage will increase again, with the temperature and the salinity of the electrolyte. So the process will continuously be repeated as shown in FIGURES 3 and 4, curve C, up to the end of the discharge of the battery.

It might be advantageous, when activating the battery, to set a fixed lag time before the electro-valve 7 closes down, since, as has been seen, the rise in temperature might be very sharp, about one second, for instance, and since the filling of the battery might be longer because it depends especially on the conditions for launching the engine. This can be achieved by means of a temporized relay (not shown on the figure) adjusted at 4 or 5 seconds, in series with the winding 19. Such a calculated relay might be a mechanical relay operated by the impact into water, or an electrical relay connected, for instance, to the battery and started at the same moment.

In addition, the valve 21 might be designed in order that a limited steady flow of fresh electrolyte could be admitted in the battery even when the valve is closed. For this purpose, a calibrated aperture could be provided through the valve.

While specific embodiments have been described and shown, variations in practice within the scope of the appended claims are possible and are contemplated. There is no intention, therefore, of limitaiton to the exact abstract or other disclosure herein presented.

What is claimed is:

1. A process for regulating the electrical characteristics of a primary battery of the sea water type subsequent to its activation with electrolyte whose salinity is substantially equivalent to that of sea water, comprising maintaining a constant rate of flow of electrolyte through the battery said electrolyte obtained from a mixing means, providing a variable flow of fresh electrolyte from an inlet and a complementary variable flow of recycled used electrolyte flowing to said mixing means, said electrolyte flowing to an outlet after passage of the latter electrolyte through the battery and liberation therefrom of gases and its filtration to remove slurry and wastes and continuously regulating the ratio of fresh electrolyte to recycled electrolyte in the electrolyte flowing through the battery in accord with the voltage at the terminals of the battery.

2. A process for regulating the electrical characteristics of a primary battery of the sea water type subsequent to its actuation with electrolyte according to claim 1, wherein said continuous regulation of the ratio of fresh electrolyte to recycle electrolyte is such that if the voltage of the battery increases over a selected reference voltage the flow of recycled electrolyte decreases and reversely if the voltage of the battery decreases below the reference voltage the flow of recycled electrolyte increases.

3. The process according to claim 2 wherein said reference voltage is determined by a steady voltage source.

4. The process according to claim 3 wherein said steady voltage source is a standard cell.

5. A process for regulating the electrical characteristics of a primary battery of the sea water type subsequent to its activation with electrolyte whose salinity is substantially equivalent to that of sea water comprising maintaining a steady flow of electrolyte through the battery by addition through an inlet of a variable flow of fresh electrolyte and a complementary variable flow of recycled used electrolyte flowing to an outlet after passage of the latter electrolyte through the battery and liberation therefrom of gases and its filtration to remove slurry and wastes and continuously regulating the ratio of fresh electrolyte to recycled electrolyte flowing through the battery in accord with the voltage at the terminals of the battery, wherein the control of the amount of fresh electrolyte introduced into the battery is effected at the inlet of said electrolyte into said battery and wherein, after activation of the battery, the outlet from the battery of said recycled electrolyte is kept open.

6. A primary battery of the magnesium-silver chloride type actuated by an electrolyte having substantially the salinity of sea water including a container having an inlet port for admission of fresh electrolyte, means at said inlet port for regulating the flow of such fresh electrolyte admitted into the battery in substantially instantaneous response to operative electrical characteristics of the battery, and an outlet port for used electrolyte from the battery, said outlet port being maintained in open condition at least after activation of said battery.

7. A primary battery of the magnesium-silver chloride type according to claim 6, wherein said regulating means include an electrically operable obturation valve movable into at least two positions.

8. A primary battery of the magnesium-silver chloride type according to claim 7, including relays respectively rated at selected limits above and below the nominal voltage of the battery for energizing said valve to its two positions.

9. A primary battery of the magnesium-silver chloride type according to claim 8, wherein one of said relays is a voltage rated relay acting when the voltage of the battery drops below a selected value to close said valve.

10. A primary battery of the magnesium-silver chloride type according to claim 9, wherein said selected value is approximately 98% of the nominal voltage of the battery.

11. A primary battery of the magnesium-silver chloride type according to claim 8, wherein one of said relays is a voltage rated relay acting when the voltage of said battery exceeds a selected value to open said valve.

12. A primary battery of the magnesium-silver chloride type according to claim 11, wherein said selected value is approximately 102% of the nominal voltage of the battery.

13. A primary battery of the magnesium-silver chloride type according to claim 6, including a by-pass secondary inlet.

14. A primary battery of the magnesium-silver chloride type according to claim 7 including timing means for operating said valve upon activation of said battery to ensure fast admission of electrolyte at the commencement of said activation.

15. A primary battery of the magnesium-silver chloride type according to claim 6, wherein said regulating means comprises a mixing valve, a pump connected thereto for ensuring flow of electrolyte, said mixing valve having two inlets respectively connected to said inlet port for fresh electrolyte and to an inlet pipe for used electrolyte, the salt content and temperature of which are increased by passage through the battery, said used electrolyte being delivered from a chamber wherein gases are liberated therefrom, and slurry removed, said mixing valve also having an outlet connected to an inlet to said pump which latter forces a mixture of electrolytes toward the battery, and means operated by energy from the battery for operating said valve and said pump.

16. A primary battery of the magnesium-silver chloride type according to claim 15 comprising means for monitoring operation of the mixing valve including servomotor means, an amplifier, means connecting said servomotor to said amplifier to operate it in response to an output signal from the amplifier derived from an input signal thereto constituted by the voltage difference between a fixed reference voltage and a selected fraction of the battery voltage at every moment.

17. A primary battery of the magnesium-sliver chloride type according to claim 16 in which any difference of voltage below the reference voltage will effect regulatory operation of said monitoring means to yield an increase of the ratio of used electrolyte flow to fresh electrolyte flow and reversely any difference of vlotage above said reference voltage will effect regulatory operation of said monitoring means to yield a decrease in the ratio of used electrolyte flow to fresh electrolyte flow.

References Cited

UNITED STATES PATENTS 3,012,087   12/1961   Billiard et al.

WINSTON A. DOUGLAS, Primary Examiner
D. L. WALTON, Assistant Examiner

U.S. Cl. X.R.

136—100